(12) United States Patent
Lin et al.

(10) Patent No.: US 11,573,633 B1
(45) Date of Patent: Feb. 7, 2023

(54) ACTIVE AREAS OF DISPLAY DEVICES

(71) Applicant: HEWLETT-PACKARD DEVELOPMENT COMPANY, L.P., Spring, TX (US)

(72) Inventors: Qian Lin, Palo Alto, CA (US); Rafael Dal Zotto, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/383,508

(22) Filed: Jul. 23, 2021

(51) Int. Cl.
  *G06F 3/01* (2006.01)
  *G06F 3/14* (2006.01)
  *G06N 20/00* (2019.01)
  *G06F 9/451* (2018.01)
  *G06V 40/19* (2022.01)
  *G06V 40/16* (2022.01)

(52) U.S. Cl.
  CPC .............. *G06F 3/013* (2013.01); *G06F 3/14* (2013.01); *G06F 9/451* (2018.02); *G06N 20/00* (2019.01); *G06V 40/161* (2022.01); *G06V 40/19* (2022.01)

(58) Field of Classification Search
  CPC ... G06F 3/013; G06F 3/14; G06F 3/11; G06F 3/12; G06F 3/17; G06F 9/451; G06N 20/00; G06V 40/161; G06V 40/19
  See application file for complete search history.

(56) References Cited

U.S. PATENT DOCUMENTS

| | | | |
|---|---|---|---|
| 8,773,326 B2 * | 7/2014 | Yamamoto | G09G 3/342 345/1.3 |
| 9,824,499 B2 * | 11/2017 | Wright | G02B 27/0093 |
| 10,613,538 B2 * | 4/2020 | Asukai | B25J 11/0005 |
| 2016/0379408 A1 * | 12/2016 | Wright | G02B 27/0172 345/633 |
| 2020/0183402 A1 * | 6/2020 | Asukai | G05D 1/0212 |
| 2021/0327394 A1 * | 10/2021 | Bui | G09G 5/10 |

* cited by examiner

*Primary Examiner* — Vijay Shankar
(74) *Attorney, Agent, or Firm* — Quarles & Brady LLP (57) ABSTRACT

In some examples an electronic device includes an image sensor and a processor. The processor is to determine an angle of an eye gaze of a user in relation to an optical axis of the image sensor and adjust, responsive to a determination that the angle exceeds a threshold angle, an active area of a display device.

14 Claims, 6 Drawing Sheets

ACTIVE AREAS OF DISPLAY DEVICES

BACKGROUND

Electronic devices such as notebooks, laptops, desktops, tablets, and smartphones may include executable code that enables users to interact with users of other electronic devices during virtual meetings. A virtual meeting, as used herein, is an online event that enables users to interact with one another. An image sensor coupled to the electronic device may record an image of a user to transmit to the other users so that the users may engage in a face-to-face virtual meeting.

BRIEF DESCRIPTION OF THE DRAWINGS

Various examples are described below referring to the following figures.

DETAILED DESCRIPTION

As described above, electronic devices such as notebooks, laptops, desktops, tablets, and smartphones may include an image sensor and executable code that enables a user to engage with an audience during a face-to-face virtual meeting. During the virtual meeting, the image sensor records a video of the user. However, the video of the user may portray the user as gazing in a direction other than the audience because the user's facial position, eye gaze, or a combination thereof is unaligned to an optical axis of the image sensor. The optical axis, as used herein, is an imaginary line along which there is a degree of rotational symmetry in the image sensor. The optical axis often passes through a center of a lens of the image sensor, though an off-axis image sensor having a chassis or other component that obstructs a lens of the off-axis image sensor may have an optical axis that passes through another part of the lens.

To encourage the user to appear to gaze in the direction of the audience, this description describes an electronic device that designates an active area of a display device with which the user interacts. The active area, as used herein, is an area of the display device that is emphasized by adjusting a setting such as a brightness, a contrast, a sharpness, a color palette, or a combination thereof, by a presence of a graphical user interface (GUI), or by a combination thereof. The electronic device determines an angle of a facial position of the user relative to an optical axis of an image sensor. Based on the angle of the facial position, the electronic device may adjust the active area of the display device so that the audience perceives that the user's face is directed toward the audience. Responsive to the facial position of the user adjusting to interact with the active area, the electronic device determines an angle of an eye gaze of the user relative to the optical axis of the image sensor. Based on the angle of the eye gaze, the electronic device may adjust the active area so that the audience perceives that the user eye gaze is directed toward the audience. In some examples, the electronic device may alert the user that the active area is available. Utilizing the electronic device that focuses the user's attention on the active area provides for an enhanced user and audience experience by portraying the user as gazing toward the audience and fostering a perception that the user is engaging with the audience.

In some examples in accordance with the present description, an electronic device is provided. The electronic device includes an image sensor and a processor. The processor is to determine an angle of an eye gaze of a user in relation to an optical axis of the image sensor and adjust, responsive to a determination that the angle exceeds a threshold angle, an active area of a display device.

In other examples in accordance with the present description, an electronic device is provided. The electronic device includes an image sensor and a processor. The processor is to determine a first angle of a facial position of a user in relation to an optical axis of the image sensor, adjust, responsive to a determination that the first angle exceeds a first threshold angle, an active area of a display device to a first area, determine, based on the adjustment of the active area to the first area, a second angle of an eye gaze of a user in relation to the optical axis of the image sensor, and adjust, responsive to a determination that the second angle exceeds a second threshold angle, the active area to a second area.

In other examples in accordance with the present description, a non-transitory machine-readable medium storing machine-readable instructions is provided. The non-transitory machine-readable medium includes all electronic mediums or media of storage, except signals. The machine-readable instructions, when executed by a processor of an electronic device, cause the processor to: detect, by an image sensor, a user presence, adjust, responsive to the user presence, an active area of a display device to a first area, determine an angle of an eye gaze of a user in relation to an optical axis of the image sensor, and adjust, responsive to a determination that the angle exceeds a threshold angle, the active area to a second area.

Figure 1:
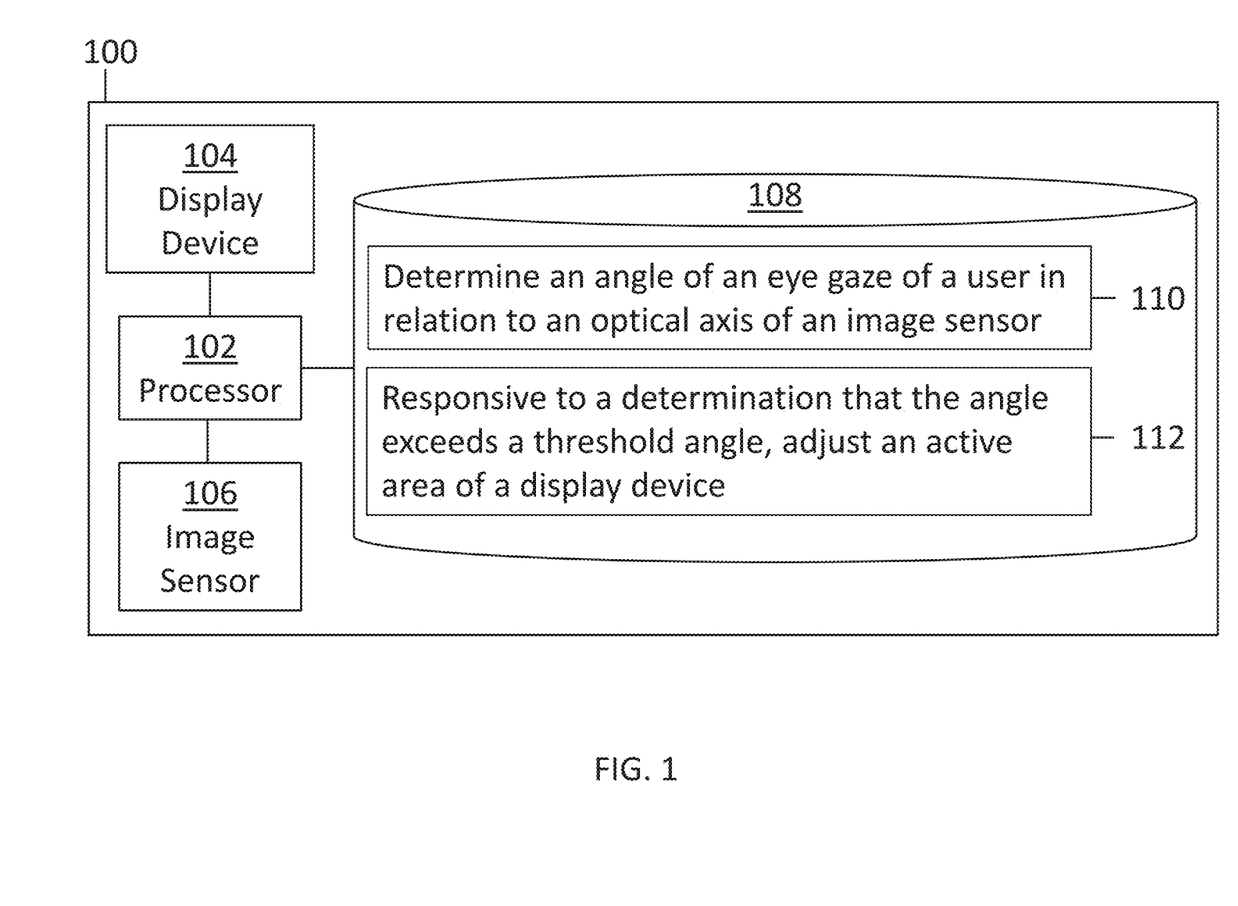
FIG. 1 is a block diagram of an electronic device for adjusting an active area of a display device in accordance with various examples.

FIG. 1 is a block diagram of an electronic device 100 for adjusting an active area of a display device 104, in accordance with various examples. The electronic device 100 may be a notebook, a laptop, a desktop, a tablet, a smartphone, or any other suitable computing device including executable code that enables a user to interact with an audience during a virtual meeting. The electronic device 100 may include a processor 102, the display device 104, an image sensor 106, and a storage device 108. The processor 102 may be a microprocessor, a microcomputer, a microcontroller, a programmable integrated circuit, a programmable gate array, or another suitable device for managing operations of the electronic device 100. The display device 104 may be a liquid crystal display (LCD), a light-emitting diode (LED) display, a plasma display, a quantum dot (QD) display, or any suitable device for displaying data of the electronic device 100 for viewing. The image sensor 106 may be an internal camera, an external camera, or any suitable device for generating a video signal. The storage device 108 may include a hard drive, solid state drive (SSD), flash memory, random access memory (RAM), or other suitable memory for storing data or executable code of the electronic device 100.

While not explicitly shown, the electronic device 100 may include a network interface, a video adapter, a sound card, local buses, input/output devices (e.g., a keyboard, a mouse, a touchpad, a speaker, a microphone), or a combination thereof. While the display device 104 is shown as an integrated display device 104, in other examples, the display device 104 may be coupled to the electronic device 100 via a wired connection (e.g., Universal Serial Bus (USB), Video Graphics Array (VGA), Digital Visual Interface (DVI), High-Definition Multimedia Interface (HDMI)) or a wireless connection (e.g., WI-FI®, BLUETOOTH®). In some examples, the display device 104 may be a flexible display device. A flexible display device, as used herein, is a display device 104 that may be deformed (e.g., rolled, folded, etc.) within a given parameter or specification (e.g., a minimum radius of curvature) without losing electrical function or connectivity. While the image sensor 106 is shown as an integrated image sensor 106, in other examples, the image sensor 106 may be coupled to the electronic device 100 via a wired connection (e.g., USB) or a wireless connection (e.g., WI-FI®, BLUETOOTH®).

In some examples, the processor 102 couples to the display device 104, the image sensor 106, and the storage device 108. The storage device 108 may store machine-readable instructions which, when executed by the processor 102, cause the processor 102 to perform some or all of the actions attributed herein to the processor 102. The machine-readable instructions may be the machine-readable instructions 110, 112.

In various examples, when executed by the processor 102, the machine-readable instructions 110, 112 cause the processor 102 to adjust an active area of the display device 104. The machine-readable instruction 110 causes the processor 102 to determine an angle of an eye gaze of a user in relation to an optical axis of the image sensor 106. Responsive to a determination that the angle exceeds a threshold angle, the machine-readable instruction 112 causes the processor 102 to adjust an active area of the display device 104.

In various examples, responsive to the processor 102 failing to detect the eye gaze of the user, the processor 102 may adjust a setting of the display device 104. The setting of the display device 104 may be a setting for a brightness, a contrast, a sharpness, a color palette, a power setting, or a combination thereof. For example, the processor 102 may reduce the brightness of another display device (not explicitly shown) coupled to the electronic device 100 to encourage the user to focus on the display device 104. The another display device may be coupled to the electronic device 100 via a wired connection (not explicitly shown) or a wireless connection (not explicitly shown).

By executing the machine-readable instruction 110, the processor 102 determines an angle of an eye gaze of the user relative to an optical axis of the image sensor 106. The processor 102 may determine the angle of the eye gaze relative to the optical axis by utilizing a tracking technique (e.g., an eye tracking technique, a gaze tracking technique, or a combination thereof). In some examples, the processor 102 may utilize a face detection technique to detect eyes of the user. For example, the processor 102 may decompose a frame recorded by the image sensor 106. The processor 102 may decompose the frame utilizing a pre-processing technique. Decomposing, as used herein, reduces objects to edge-like structures. The pre-processing techniques may include grayscaling, blurring, sharpening, thresholding, resizing, cropping, or a combination thereof. The processor 102 may utilize the face detection technique to determine whether low intensity regions of the decomposed frame include the user's eyes. The processor 102 may utilize the face detection technique to determine features of the eyes. The features of the eyes may include eyebrows, eyelids, irises, pupils, or a combination thereof. The processor 102 may utilize the tracking technique to determine an eye gaze direction based on a location of the features. For example, utilizing the face detection technique, the processor 102 may identify the eyes of the user in a frame recorded by the image sensor 106. The processor 102 may determine locations of the features of the eyes. Based on the locations of the features relative to a location of an intersection of the optical axis with the user, the processor 102 may determine an eye gaze direction of the user. The processor 102 may determine the angle between the eye gaze direction and the location of the intersection of the optical axis with the user. In other examples, the processor 102 may cause the image sensor 106 to emit an infrared light. The image sensor 106 detects a reflection of the infrared light. The processor 102 analyzes data of the reflection to determine the angle between the eye gaze direction and the optical axis of the image sensor 106.

In some examples, by executing another machine-readable instruction, the processor 102 may determine that the angle of the eye gaze exceeds a threshold angle by comparing the angle of the eye gaze relative to the optical axis to the threshold angle. In various examples, a manufacturer of the electronic device 100 may specify the threshold angle at a time of manufacturing. In other examples, a user of the electronic device 100 may specify the threshold angle utilizing a graphical user interface (GUI) of the electronic device 100. In various examples, an administrator of a domain associated with the electronic device 100 may specify the threshold angle. The domain associated with the electronic device 100 may be a domain of an organization or a business entity that owns the electronic device 100, for example.

Responsive to a determination that the angle exceeds the threshold angle, by executing the machine-readable instruction 112, the processor 102 adjusts an active area of the display device 104. As described above, the processor 102 may emphasize the active area of the display device 104 by modifying a setting of the display device 104, by causing a GUI to populate the active area, or a combination thereof. For example, the processor 102 may enhance a brightness of the active area of the display device 104, may reduce a brightness of a non-active area of the display device 104, or a combination thereof. In another example, the processor 102 may enhance a sharpness and a contrast of the active area of the display device 104, may reduce a sharpness and a contrast of the non-active area of the display device 104, or a combination thereof. In some examples, the processor 102 may alert the user that the active area is available. The processor 102 may alert the user by causing the display device 104 to display a GUI that notifies the user where to look, for example. In another example, the processor 102 may alert the user by causing the display device 104 to display an outline or border around the active area. In yet another example, the processor 102 may cause the display device 104 to display a desktop of the display device in the active area and to disable pixels of the non-active area. The processor 102 emphasizing the active area of the display device 104 encourages the user to focus on the active area and enhances the user and audience experience by fostering an impression of a face-to-face meeting.

Figure 2:
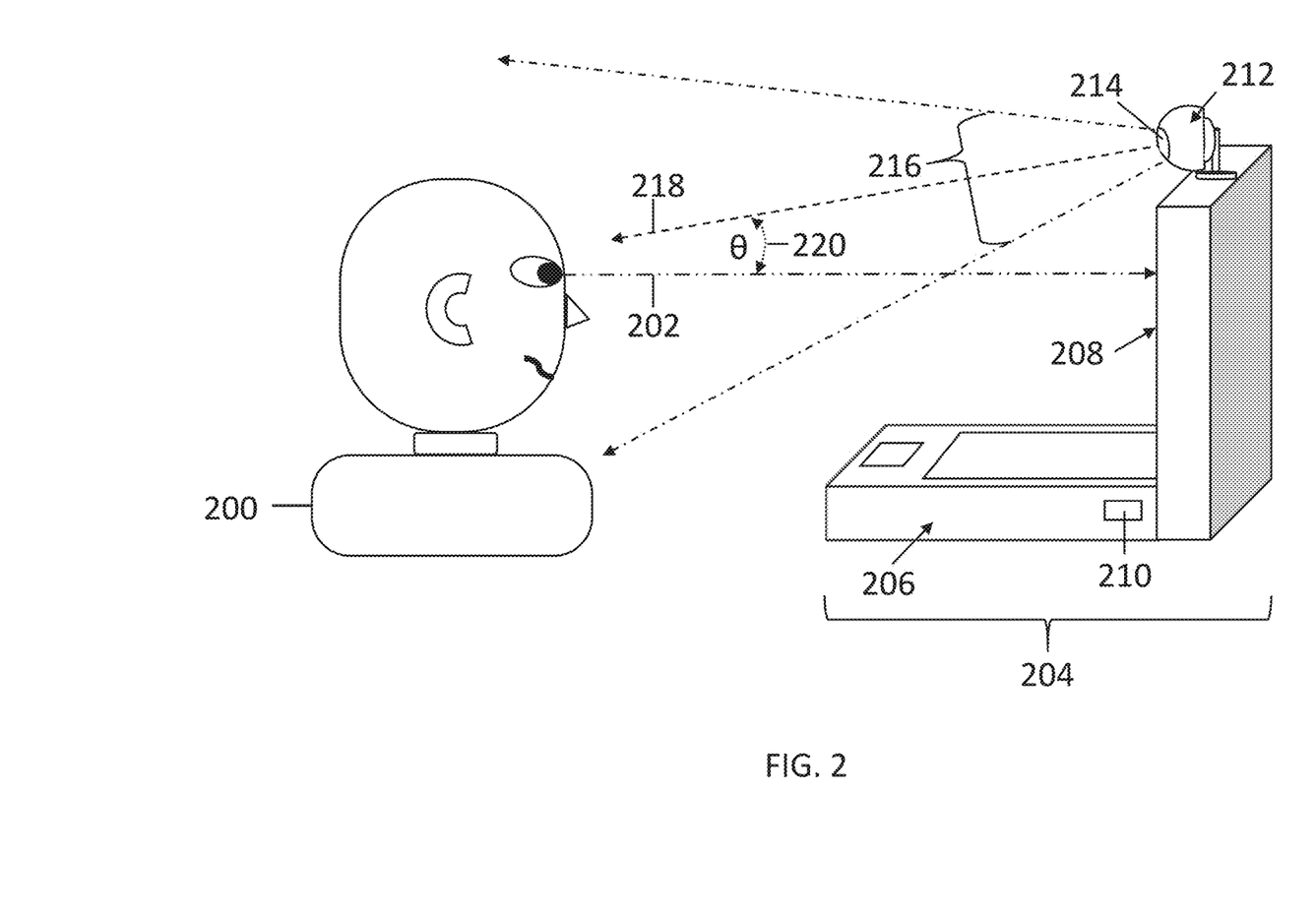
FIG. 2 is an example of an electronic device adjusting an active area of a display device in accordance with various examples.

Referring now to FIG. 2, an example of an electronic device 204 adjusting an active area of a display device 208 is provided, in accordance with various examples. The electronic device 204 may be the electronic device 100. The display device 208 may be the display device 104. The electronic device 204 includes a chassis 206. The chassis 206 may house the display device 208 and a connector 210. The connector 210 may be any suitable connector that enables an input/output device to couple to the electronic device 204. The connector 210 may be a USB connector, an audio jack connector, a HDMI connector, or a VGA connector, for example. An image sensor 212 may couple to the electronic device 204 via the connector 210 or via a wireless transceiver (not explicitly shown). The image sensor 212 may be the image sensor 106 that is external to the electronic device 204. The image sensor 212 may include a lens 214. The image sensor 212 may have a field of view 216 and an optical axis 218.

In some examples, a user 200 may interact with the electronic device 204. An angle 220 is the angle 220 of an eye gaze 202 of the user 200 relative to the optical axis 218. As described above with respect to FIG. 1, a processor (e.g., the processor 102) of the electronic device 204 may determine the angle 220 of the eye gaze 202 of the user 200 in relation to the optical axis 218 of the image sensor 212. Responsive to a determination that the angle 220 exceeds a threshold angle, the processor adjusts an active area of the display device 208.

Figure 3:
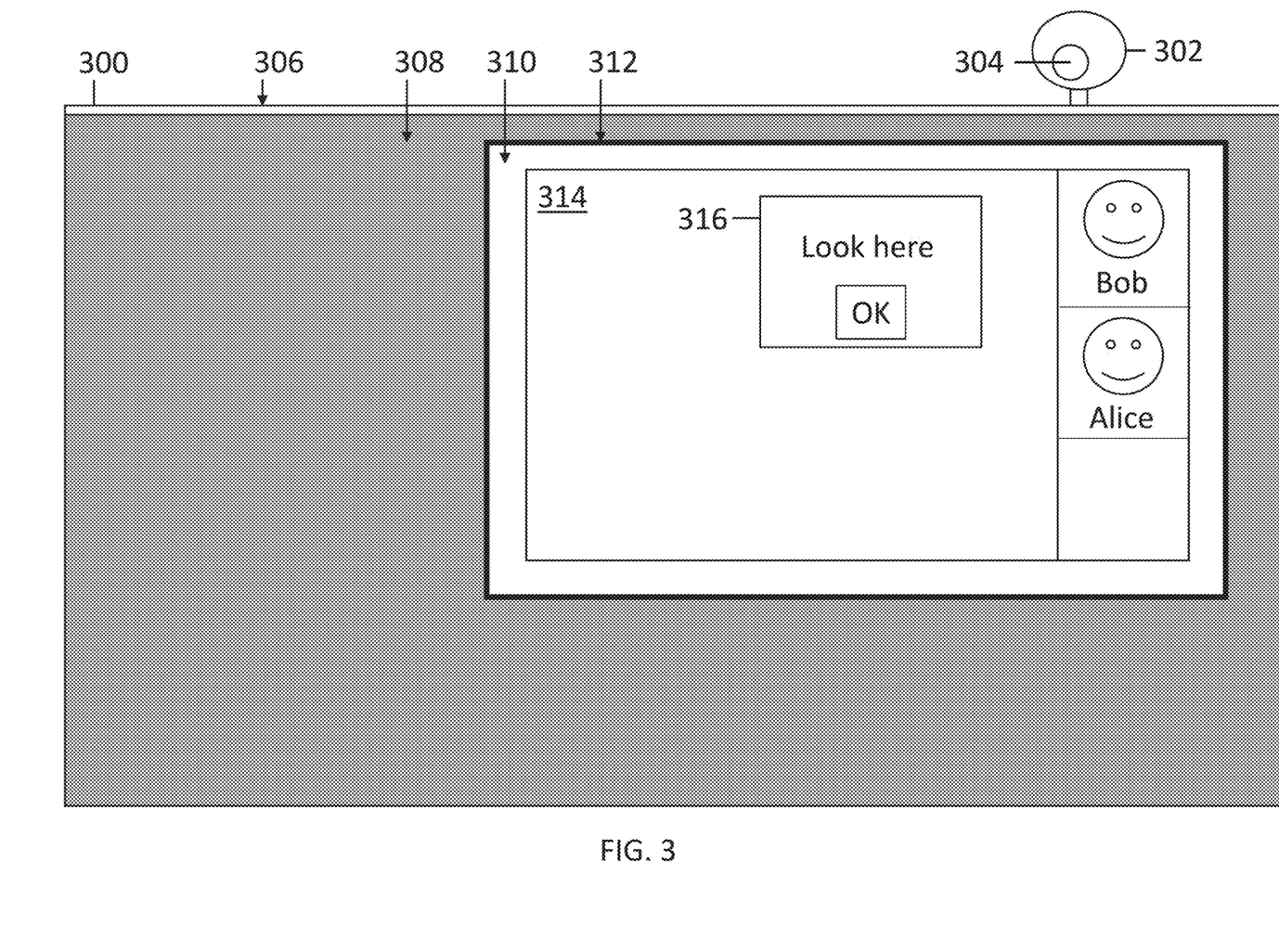
FIG. 3 is a block diagram of a display device that includes an active area in accordance with various examples.

Referring now to FIG. 3, a block diagram of a display device 300 that includes an active area 310. The display device 300 may be the display device 104, 208. The display device 300 includes a chassis 306. The chassis 306 may be the chassis 206. The chassis 306 may secure a display panel 308. The display panel 308 includes the active area 310. The active area 310 has an outline 312 and includes windows 314, 316. The window 314 may be a GUI for the executable code that enables the user (e.g., the user 200) to interact with the audience during virtual meetings. The window 316 may be a GUI that notifies the user of a location of the active area 310. An image sensor 302 may be external to the chassis 306. The image sensor 302 may be the image sensor 106, 212. The image sensor 302 may include a lens 304. The lens 304 may be the lens 214.

Prior to a determination that the angle (e.g., the angle 220) of the user's eye gaze (e.g., the eye gaze 202 of the user 200) relative to the optical axis (e.g., the optical axis 218) of the image sensor 302 exceeds the threshold angle, the active area 310 may encompass an entire display area of the display panel 308. As described above with respect to FIGS. 1 and 2, responsive to a determination that the angle of the user's eye gaze relative to the optical axis of the image sensor 302 exceeds the threshold angle, a processor (e.g., the processor 102) of an electronic device (e.g., the electronic device 100, 204) adjusts the active area 310 of the display device 300. The processor may determine a location of the active area 310 such that the user's eye gaze appears to focus on the lens 304. The processor may enhance a brightness of the active area 310, decrease a brightness of the inactive area of the display device 300 as indicated by the gray area of the display panel 308, or a combination thereof. The processor may cause the display device 300 to display the outline 312 around the active area 310. The processor may cause the display device 300 to display the GUI for the executable code that enables the user to interact with the audience during virtual meetings in the window 314 of the active area 310. The processor may cause the display device 300 to display the notification that alerts the user where to look to give an impression that the user is gazing in the direction of the audience in the window 316. In some examples, the window 316 may be a second window of the GUI for the executable code that enables the user to interact with the audience during virtual meetings. In other examples, the window 316 may be a window of a second GUI. The second GUI may be for executable code that enables the user to specify threshold angles, for example. Utilizing the electronic device that focuses the user's attention on the active area 310 of the display device 300 provides for an enhanced user and audience experience by portraying the user as gazing toward the audience and fostering a perception that the user is engaging with the audience.

Figure 4:
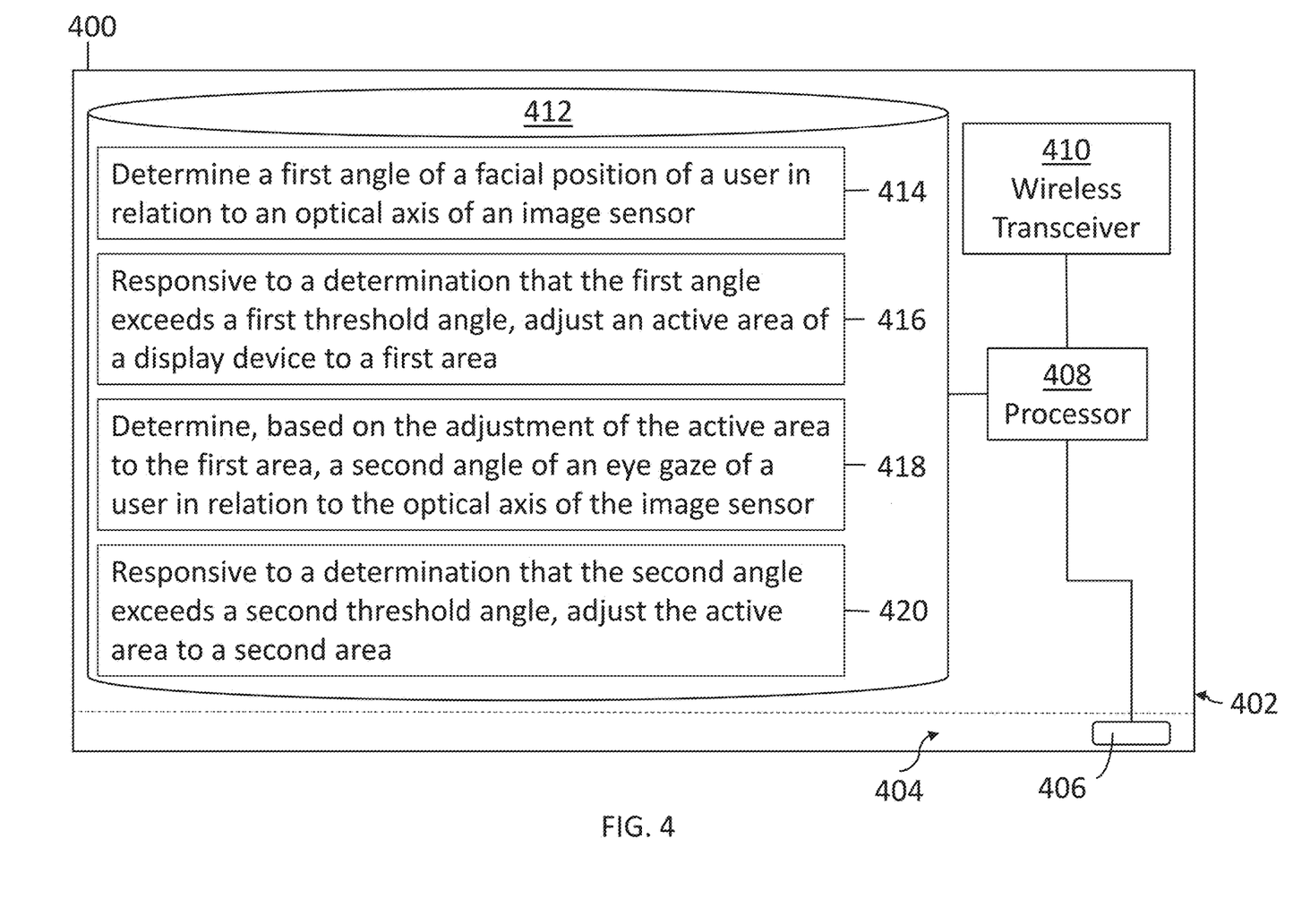
FIG. 4 is a block diagram of an electronic device for adjusting an active area of a display device in accordance with various examples.

Referring now to FIG. 4, a block diagram of an electronic device 400 for adjusting an active area (e.g., the active area 310) of a display device (e.g., the display device 104, 208, 300) is provided, in accordance with various examples. The electronic device 400 may be the electronic device 100, 204. The electronic device 400 may include a chassis 402. The chassis 402 may be the chassis 206, 306. The chassis 402 may have an outer surface 404. The outer surface 404 may provide access to a connector 406. The connector 406 may be the connector 210. The chassis 402 may house hardware components of the electronic device 400 such as a processor 408, a wireless transceiver 410, and a storage device 412. The processor 408 may be the processor 102. The wireless transceiver 410 may be to transmit and receive signals. The wireless transceiver 410 may transmit and receive a BLUETOOTH® signal, a WI-FI® signal, or a combination thereof, for example. The storage device 412 may be the storage device 108.

In some examples, the processor 408 couples to the connector 406, the wireless transceiver 410, and the storage device 412. The storage device 412 may store machine-readable instructions which, when executed by the processor 408, cause the processor 408 to perform some or all of the actions attributed herein to the processor 408. The machine-readable instructions may be the machine-readable instructions 414, 416, 418, 420.

In various examples, when executed by the processor 408, the machine-readable instructions 414, 416, 418, 420 cause the processor 408 to adjust an active area (e.g., the active area 310) of the display device. The display device may couple to the connector 406 or wirelessly couple to the wireless transceiver 410. The machine-readable instruction 414 causes the processor 408 to determine a first angle of a facial position of a user (e.g., the user 200) in relation to an optical axis (e.g., the optical axis 218) of an image sensor (e.g., the image sensor 106, 212, 302). The image sensor may couple to the connector 406 or to the wireless transceiver 410. Responsive to a determination that the first angle exceeds a first threshold angle, the machine-readable instruction 416 causes the processor 408 to adjust the active area of the display device to a first area. The machine-readable instruction 418 causes the processor 408 to determine, based on the adjustment of the active area to the first area, a second angle of an eye gaze (e.g., the eye gaze 202) of the user in relation to the optical axis of the image sensor. Responsive to a determination that the second angle exceeds a second threshold angle, the machine-readable instruction 420 causes the processor 408 to adjust the active area to a second area.

As described above with respect to FIG. 1, in various examples, a manufacturer of the electronic device 400 may specify the first and the second threshold angles at a time of manufacturing. In other examples, a user of the electronic device 400 may specify the first and the second threshold angles utilizing a graphical user interface (GUI) of the electronic device 400. In some examples, an administrator of a domain associated with the electronic device 400 may specify the first and the second threshold angles.

By executing the machine-readable instruction 414, the processor 408 determines an angle of a facial position of the user relative to the optical axis of the image sensor. The processor 408 may determine the angle of the facial position relative to the optical axis by utilizing a face detection technique, as discussed above with respect to FIG. 1. For example, the processor 408 may utilize the face detection technique to identify facial landmarks. The facial landmarks may include eyes, nose, lips, mouth, or a combination thereof. To determine the angle of the facial position relative to the optical axis, the processor 408 may utilize the face detection technique to determine distances and positions of the facial landmarks relative to each other, determine positions of the facial landmarks relative to non-facial regions, compare the facial landmarks to different facial position templates, or a combination thereof. In some examples, the processor 408 may determine a location of a central axis of the facial landmarks. The processor 408 may determine the angle of the facial position based on an angle between the central axis and the optical axis.

In other examples, the processor 408 may compare locations of the facial landmarks to locations of facial landmarks of different facial position templates. The facial position templates may include a template for a left three-quarter view, a right three-quarter view, a full-frontal view, a left profile view, a right profile view, a frontal view from below, a frontal view from above, or some combination thereof for example. In yet other examples, the processor 408 may measure distances between the facial landmarks and compare the measurements to measurements of the facial landmarks of different facial position templates to determine the user's facial position. The processor 408 may determine the angle of the facial position relative to the optical axis based on the facial position template that the facial position of the user most resembles.

In various examples, the processor 408 may determine that the angle of the facial position exceeds the first threshold angle based on the facial position template that the facial position of the user most resembles. For example, the processor 408 may determine that the angle of the facial position exceeds the first threshold angle responsive to the facial position of the user resembling any facial position template other than a full-frontal view.

Responsive to a determination that the angle of the facial position exceeds the first threshold angle, by executing the machine-readable instruction 416, the processor 408 adjusts the active area of the display device to the first area. As described above with respect to FIGS. 1 and 3, in some examples, the processor 408 may alert the user that the active area is available by causing the display device to display a notification (e.g., the window 316). In other examples, the processor 408 may modify a setting of the display device to encourage the user to focus on the active area. For example, the processor 408 may enhance a brightness of the active area and modify a color palette of the non-active area to display in black and white. In various examples, the processor 408 may cause a GUI (e.g., the window 314) to display within the active area.

By executing the machine-readable instruction 418, the processor 408 determines the angle of the eye gaze of the user relative to the optical axis of the image sensor. The processor 408 may determine the angle of the eye gaze relative to the optical axis by utilizing a tracking technique, as described above with respect to FIG. 1. Responsive to a determination that the angle of the eye gaze exceeds the second threshold angle, by executing the machine-readable instruction 420, the processor 408 adjusts the active area of the display device to the second area. The first and the second areas may have top, bottom, left, and right borders that are parallel to respective edges of the display device. In some examples, the second area may be an area within the first area. For example, the processor 408 may determine that the second area is defined by a same left, right, and top border as the first area but that the second area is defined by a different bottom border that is within the borders first area. In other examples, a region of the second area may overlap a region of the first area. For example, a right border of the second area may extend past a right border of the first area and a left border of the second area may be within the borders of the first area.

Figure 5A:
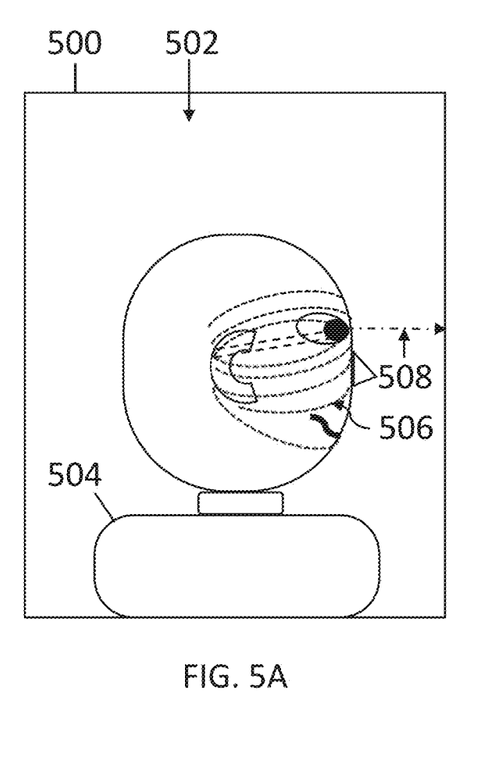
FIGS. 5A, 5B, and 5C are block diagrams of display devices that include active areas in accordance with various examples.
Figure 5B:
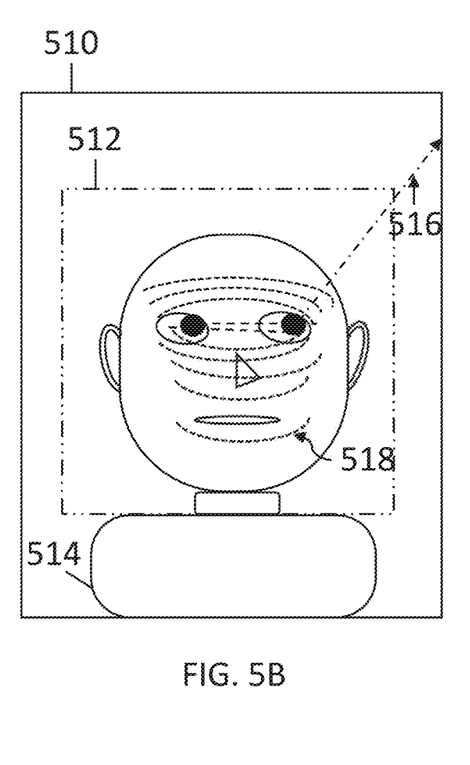
Figure 5C:
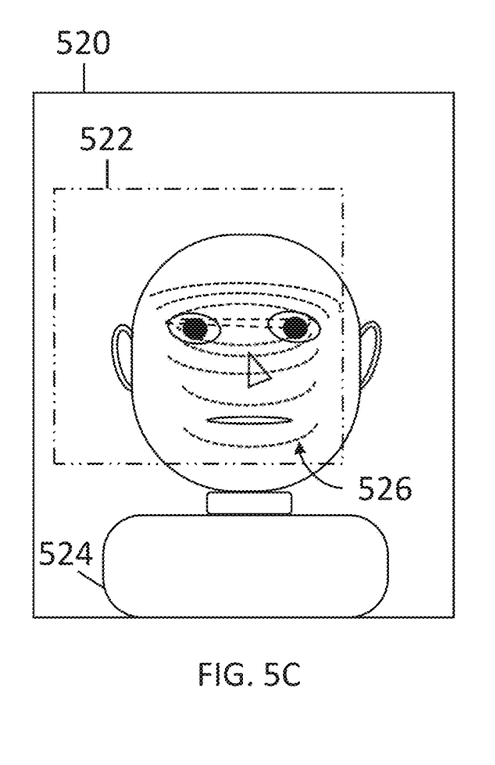

Referring now to FIGS. 5A, 5B, and 5C, block diagrams of display devices 500, 510, 520 that include active areas 502, 512, 522 are provided, in accordance with various examples. The display device 500 may be the display device 104, 208, 300, a display device coupled to the connector 210, 406, or a display device wirelessly coupled to the wireless transceiver 410. FIG. 5A includes the display device 500 that includes the active area 502 that is displaying an image of a user 504 that is recorded by an image sensor. The image sensor may be the image sensor 106, 212, 302, an image sensor coupled to the connector 210, 406, or an image sensor wirelessly coupled to the wireless transceiver 410. Coordinates 506 indicate points of the image of the user 504 that include facial landmarks. An axis 508 indicates an eye gaze direction (e.g., the eye gaze 202) of the user 504. FIG. 5B includes the display device 510 that includes the active area 512 that is displaying an image of a user 514. The display device 510 may be the display device 500. The active area 512 may be the active area 502. The user 514 may be the user 504. An axis 516 represents an eye gaze direction of the user 514. Coordinates 518 indicate points of the image of the user 514 that include facial landmarks. FIG. 5C includes the display device 520 that includes the active area 522 that is displaying an image of a user 524. The display device 520 may be the display device 500, 510. The active area 522 may be the active area 502, 512. The user 524 may be the user 504, 514. Coordinates 526 indicate points of the image of the user 524 that include facial landmarks.

FIGS. 5A, 5B, and 5C may represent a sequence of an electronic device (e.g., the electronic device 100, 204, 400) adjusting the active area 502, 512, 522 of the display device 500, 510, 520. As described above with respect to FIG. 4, a processor (e.g., the processor 102, 408) may determine the angle of a facial position of the user 504 in relation to an optical axis (e.g., the optical axis 218) of an image sensor (e.g., the image sensor 106, 212, 302). Responsive to a determination that the angle exceeds a first threshold angle, the processor adjusts the active area 502 of the display device 500 (FIG. 5A) to the active area 512 of the display device 510 (FIG. 5B). The processor determines, based on the adjustment of the active area 502 to the active area 512, the angle of the eye gaze direction represented by the axis 516 of the user 514 in relation to the optical axis. Responsive to a determination that the angle exceeds a second threshold angle, the processor adjusts the active area 512 of the display device 510 (FIG. 5B) to the active area 522 of the display device 520 (FIG. 5C).

In some examples, as described above with respect to FIG. 4, the active area 512 may be referred to as an area within the active area 502. In other examples, a region of the active area 522 may be referred to as overlapping a region of the active area 512 because a left border of the active area 522 extends past a left border of the active area 512 and a bottom border and a right border of the active area 512 extends beyond a bottom border and a right border of the active area 522.

In various examples, the processor utilizes the coordinates 506, 518, 526 to determine the facial position, the eye gaze, or a combination thereof of the user 504, 514, 524, respectively. A coordinate of the coordinates 506, 518, 526 may have a value associated with the coordinate. Utilizing the face detection techniques described above, the processor may analyze the values to identify facial landmarks and determine an angle of the facial position of the user 504, 514, 524 relative to the optical axis of the image sensor. Utilizing the tracking techniques described above, the processor may analyze the values to determine an angle of the eye gaze of the user 504, 514, 524 relative to the optical axis of the image sensor.

In some examples, the processor monitors the coordinates 506, 518, 526 for changes in the facial position, eye gaze, or a combination thereof of the user 504, 514, 524. Responsive to a change in the facial position or the eye gaze, the processor may adjust the active area 502, 512, 522 to another area of the display device 500, 510, 520. In various examples, responsive to detecting a change in the facial position or the eye gaze, the processor may allow a specified duration of time to elapse. The specified duration of time may be thirty seconds, a minute, or some other period of time that enables the user 504, 514, 524 to look away from the active area 502, 512, 522 to take notes, refer to other documentation, or perform another activity related to the virtual meeting. After the specified duration of time elapses, the processor may determine whether an angle of the facial position exceeds the respective threshold angle, an angle of the eye gaze exceeds the respective threshold angle, or a combination thereof. Response to the angle exceeding the threshold angle, the processor may adjust the active area 502, 512, 522.

Figure 6:
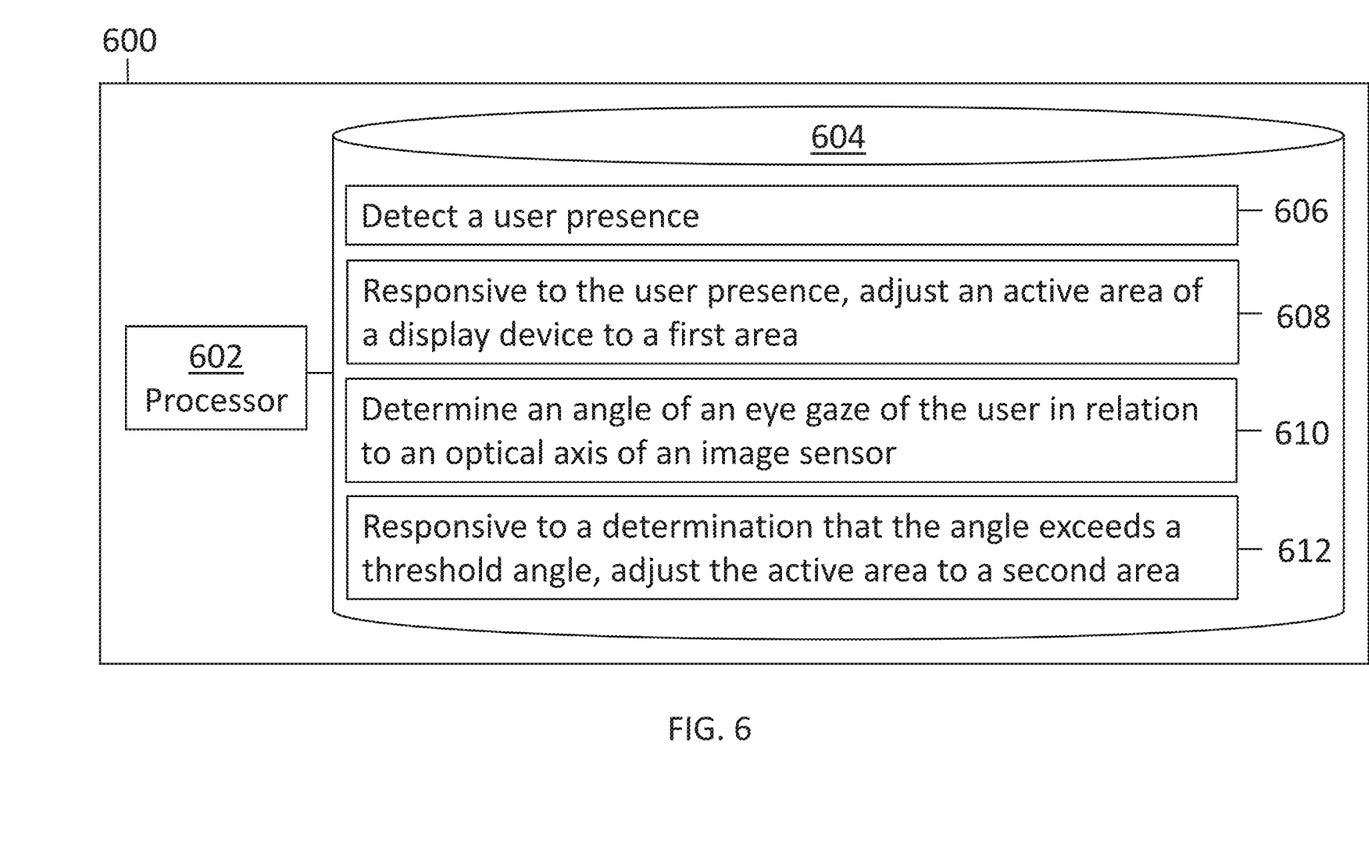
FIG. 6 is a block diagram of an electronic device for adjusting an active area of a display device in accordance with various examples.

Referring now to FIG. 6, a block diagram of an electronic device 600 for adjusting an active area (e.g., the active area 310, 502, 512, 522) of a display device (e.g., the display device 104, 208, 300, 500, 510, 520) is provided, in accordance with various examples. The electronic device 600 may be the electronic device 100, 204, 400. The electronic device 600 includes a processor 602 and a non-transitory machine-readable medium 604. The processor 602 may be the processor 102, 408. The non-transitory machine-readable medium 604 may be the storage device 108, 412. As described above, the term "non-transitory" does not encompass transitory propagating signals.

In various examples, the processor 602 couples to the non-transitory machine-readable medium 604. The non-transitory machine-readable medium 604 may store machine-readable instructions. The machine-readable instructions may be the machine-readable instructions 606, 608, 610, 612. The machine-readable instructions 606, 608, 610, 612, when executed by the processor 602, cause the processor 602 to perform some or all of the actions attributed herein to the processor 602.

In various examples, when executed by the processor 602, the machine-readable instructions 606, 608, 610, 612 cause the processor 602 to adjust the active area of the display device. The machine-readable instruction 606 causes the processor 602 to detect a user presence. The user presence may be a presence of the user 200, 504, 514, 524. The processor 602 may detect the user presence via the image sensor. The image sensor may be the image sensor 106, 212, 302. Responsive to the user presence, the machine-readable instruction 608 causes the processor 602 to adjust the active area of the display device to a first area. The machine-readable instruction 610 causes the processor 602 to determine an angle of an eye gaze (e.g., the eye gaze 202) of a user in relation to an optical axis (e.g., the optical axis 218) of the image sensor. Responsive to a determination that the angle exceeds a threshold angle, the machine-readable instruction 612 causes the processor 602 to adjust the active area to a second area.

In some examples, a machine learning technique may utilize data from previous virtual meetings to determine the first active area. The machine learning technique may be a supervised learning technique such as logistic regression, k-Nearest Neighbor (kNN), or decision tree; an unsupervised learning technique such as K-means; a reinforced learning technique such as Markov decision process; or a combination thereof. Utilizing the machine learning technique, the processor 602 determines relationships between variables such as threshold angles, locations of the active areas, facial positions of the user, eye gazes of the user, locations of the user, locations of the image sensor, or a combination thereof. Based on the relationships, the processor 602 may more accurately predict an area of the display device to display the first active area upon execution of the executable code that enables the user to engage in virtual meetings with the audience.

For example, referring briefly to FIGS. 5A, 5B, and 5C, the processor 602 may detect a presence of the user 504. Responsive to the presence of the user 504, the processor 602 utilizes the machine learning technique to adjust the active area 502 (FIG. 5A) to the active area 512 of the display device 510 (FIG. 5B). The processor 602 determines the angle of the eye gaze of the user 514 relative to the optical axis. Responsive to a determination that the angle exceeds the threshold angle, the processor 602 adjusts the active area 512 (FIG. 5B) to the active area 522 (FIG. 5C). Utilizing the electronic device that focuses the attention of the user 504, 514, 524 on the active area 502, 512, 522 provides for an enhanced user 504, 514, 524 and audience experience by portraying the user 504, 514, 524 as gazing toward the audience and fostering a perception that the user 504, 514, 524 is engaging with the audience.

While the examples above describe a single display device 104, 208, 300, a display device coupled to the connector 210, 406, or a display device wirelessly coupled to the wireless transceiver 410, in other examples, multiple display devices may couple to the electronic device 100, 204, 400, 600. The multiple display devices may couple to the electronic device via a wired connection to the connector 210, 406 or a wireless connection to the wireless transceiver 410. Upon execution of the GUI that enables the user 200, 504, 514, 524 to interact with the audience during a virtual meeting, the processor 102, 408, 602 may cause a first display device to display the GUI in the active area 310, 502, 512, 522. In some examples, responsive to the image sensor 106, 212, 302 detecting a presence of the user 200, 504, 514, 524, the processor 102, 408, 602 may adjust the active area 310, 502, 512, 522 to a second display device. In other examples, responsive to a determination that the angle of the user's eye gaze relative to the optical axis exceeds a threshold angle, the processor 102, 408, 602 adjusts the active area 310, 502, 512, 522. For example, the processor 102, 408, 602 may adjust the active area 310, 502, 512, 522 to a third display device. In another example, the processor 102, 408, 602 adjusts the active area 310, 502, 512, 522 to a second area of the second display device. In various examples, responsive to a determination that the angle of the user's facial position relative to the optical axis exceeds a threshold angle, the processor 102, 408, 602 adjusts the active area 310, 502, 512, 522. For example, the processor 102, 408, 602 may adjust the active area 310, 502, 512, 522 to a second area of the first display device. In another example, the processor 102, 408, 602 adjusts the active area 310, 502, 512, 522 to a third area of the second display device.

The above description is meant to be illustrative of the principles and various examples of the present description. Numerous variations and modifications become apparent to those skilled in the art once the above description is fully appreciated. It is intended that the following claims be interpreted to embrace all such variations and modifications.

In the figures, certain features and components disclosed herein may be shown in exaggerated scale or in somewhat schematic form, and some details of certain elements may not be shown in the interest of clarity and conciseness. In some of the figures, in order to improve clarity and conciseness, a component or an aspect of a component may be omitted.

In the above description and in the claims, the term "comprising" is used in an open-ended fashion, and thus should be interpreted to mean "including, but not limited to . . . ." Also, the term "couple" or "couples" is intended to be broad enough to encompass both direct and indirect connections. Thus, if a first device couples to a second device, that connection may be through a direct connection or through an indirect connection via other devices, components, and connections. Additionally, as used herein, the word "or" is used in an inclusive manner. For example, "A or B" means any of the following: "A" alone, "B" alone, or both "A" and "B".

What is claimed is:

1. A non-transitory machine-readable medium storing machine-readable instructions which, when executed by a processor of an electronic device, cause the processor to:
    detect, by an image sensor, a user presence;
    adjust, responsive to the user presence, an active area of a display device;
    determine a first angle of an eye gaze of a user in relation to an optical axis of the image sensor;
    adjust, responsive to a determination that the first angle exceeds a first threshold angle, the active area to a first area;
    determine, based on the adjustment of the active area to the first area, a second angle of an eye gaze of the user in relation to the optical axis of the image sensor; and
    adjust, responsive to a determination that the second angle exceeds a second threshold angle, the active area to a second area.

2. The non-transitory machine-readable medium of claim 1, wherein the processor is to utilize a machine learning technique to adjust the active area of the display device.

3. The non-transitory machine-readable medium of claim 1, wherein the machine-readable instructions, when executed by the processor, cause the processor to: determine a third angle of the eye gaze of the user in relation to the optical axis of the image sensor; and adjust, responsive to a determination that the third angle exceeds the first threshold angle, the active area to a third area.

4. The non-transitory machine-readable medium of claim 1, wherein the first area is of a second display device.

5. An electronic device, comprising:
    an image sensor; and
    a processor to:
        determine a first angle of a facial position of a user in relation to an optical axis of the image sensor;
        adjust, responsive to a determination that the first angle exceeds a first threshold angle, an active area of a display device to a first area;
        determine, based on the adjustment of the active area to the first area, a second angle of an eye gaze of the user in relation to the optical axis of the image sensor; and
        adjust, responsive to a determination that the second angle exceeds a second threshold angle, the active area to a second area.

6. The electronic device of claim 5, wherein the second area is a region within the first area.

7. The electronic device of claim 5, wherein a first region of the first area is overlapping a second region of the second area.

8. The electronic device of claim 5, wherein the processor is to utilize a face detection technique to determine the facial position of the user.

9. The electronic device of claim 5, wherein the processor is to utilize a tracking technique to determine a direction of the eye gaze of the user.

10. An electronic device, comprising:
    an image sensor; and
    a processor to:
        determine a first angle of an eye gaze of a user in relation to an optical axis of the image sensor;
        adjust, responsive to a determination that the angle exceeds a threshold angle, an active area of a display device to a first area;
        determine, based on the adjustment of the active area to the first area, a second angle of an eye gaze of the user in relation to the optical axis of the image sensor; and
        adjust, responsive to a determination that the second angle exceeds a second threshold angle, the active area to a second area.

11. The electronic device of claim 10, wherein the processor is to modify a setting of the display device to indicate the active area.

12. The electronic device of claim 10, wherein the processor is to cause the display device to display an outline around the active area.

13. The electronic device of claim 10, wherein the processor is to cause the display device to display a graphical user interface (GUI) in the active area.

14. The electronic device of claim 10, wherein the processor is to cause the display device to display a notification in the active area.

* * * * *